(12) United States Patent
Lawson et al.

(10) Patent No.: US 11,870,853 B2
(45) Date of Patent: **\*Jan. 9, 2024**

(54) SYSTEM AND METHOD FOR CONTEXTUAL COMMUNICATION

(71) Applicant: Twilio Inc., San Francisco, CA (US)

(72) Inventors: Jeffrey Lawson, San Francisco, CA (US); Rob Brazier, San Francisco, CA (US); Peter Lee, San Francisco, CA (US); Manav Khurana, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 16/894,365

(22) Filed: Jun. 5, 2020

(65) Prior Publication Data

US 2020/0304578 A1    Sep. 24, 2020

Related U.S. Application Data

(63) Continuation of application No. 15/381,921, filed on Dec. 16, 2016, now Pat. No. 10,749,964.

(60) Provisional application No. 62/268,851, filed on Dec. 17, 2015.

(51) Int. Cl.
| | |
|---|---|
| *H04L 67/141* | (2022.01) |
| *H04L 65/403* | (2022.01) |
| *G06Q 30/016* | (2023.01) |
| *H04M 3/51* | (2006.01) |
| *H04L 67/14* | (2022.01) |
| *H04M 3/523* | (2006.01) |

(52) U.S. Cl.
CPC ......... *H04L 67/141* (2013.01); *G06Q 30/016* (2013.01); *H04L 65/403* (2013.01); *H04L 67/14* (2013.01); *H04M 3/51* (2013.01); *H04M 3/523* (2013.01)

(58) Field of Classification Search
CPC ..... H04L 67/141; H04L 65/403; H04L 67/14; G06Q 30/016; H04M 3/51; H04M 3/523
See application file for complete search history.

(56) References Cited

U.S. PATENT DOCUMENTS

| | | | | |
|---|---|---|---|---|
| 5,696,809 | A * | 12/1997 | Voit ................... | H04M 3/2254 379/267 |
| 5,915,012 | A * | 6/1999 | Miloslavsky ....... | H04M 3/5237 379/265.02 |
| 6,163,536 | A * | 12/2000 | Dunn .................... | H04L 65/103 370/352 |
| 6,493,447 | B1 * | 12/2002 | Goss .................... | H04L 65/401 709/203 |
| 7,133,895 | B1 * | 11/2006 | Lee ..................... | H04L 65/4015 715/255 |

(Continued)

*Primary Examiner* — Ramy M Osman
(74) *Attorney, Agent, or Firm* — Schwegman Lundberg & Woessner, P.A.

(57) ABSTRACT

A system and method for facilitating contextual communications that includes creating a contextual resource that is initially associated with at least at first communication session; receiving an incoming communication request and establishing a second communication session; associating the second communication session with the contextual resource; setting contextual information of the contextual resource; performing at least one contextual communication action.

17 Claims, 9 Drawing Sheets

(56) References Cited

U.S. PATENT DOCUMENTS

| | | | |
|---|---|---|---|
| 7,783,914 B1* | 8/2010 | Havemose | H04L 61/5007 714/4.11 |
| 10,192,179 B1* | 1/2019 | Agarwal | G06Q 10/063114 |
| 2002/0035647 A1* | 3/2002 | Brown | H04L 67/535 719/312 |
| 2005/0177525 A1* | 8/2005 | Apple | G06Q 30/02 705/400 |
| 2006/0167941 A1* | 7/2006 | Huang | H04M 3/5141 |
| 2007/0136392 A1* | 6/2007 | Oh | G06F 9/4856 |
| 2009/0214021 A1* | 8/2009 | Williams | H04M 3/5232 379/266.01 |
| 2011/0188410 A1* | 8/2011 | Levin | H04M 3/42 370/352 |
| 2012/0036452 A1* | 2/2012 | Coleman | G06F 21/55 715/751 |
| 2012/0135717 A1* | 5/2012 | Fiedorowicz | H04L 67/02 455/414.1 |
| 2012/0290663 A1* | 11/2012 | Hsieh | G06F 9/4856 709/217 |
| 2013/0195258 A1* | 8/2013 | Atef | H04L 67/34 379/265.09 |
| 2014/0089822 A1* | 3/2014 | Wu | G06F 3/04817 715/761 |
| 2014/0161249 A1* | 6/2014 | Tolksdorf | H04M 3/523 379/266.1 |
| 2014/0229438 A1* | 8/2014 | Carriero | G06F 16/27 707/625 |
| 2014/0254788 A1* | 9/2014 | Annapareddy | G06F 11/30 379/265.09 |
| 2015/0163177 A1* | 6/2015 | Cahill | H04L 67/42 709/206 |
| 2015/0256677 A1* | 9/2015 | Konig | H04M 3/5191 379/265.09 |
| 2015/0312412 A1* | 10/2015 | Cahill | H04M 3/5191 379/265.09 |

* cited by examiner

Creating a contextual resource that is initially associated with at least at first communication session S210

Receiving an incoming communication request and establishing a second communication session S220

Associating the second communication session with the contextual resource S230

Setting contextual information of the contextual resource S240

Performing at least one contextual communication action through a programmatic interface of the contextual resource S250

FIGURE 5

SYSTEM AND METHOD FOR CONTEXTUAL COMMUNICATION

CROSS-REFERENCE TO RELATED APPLICATIONS

This application is a continuation of U.S. patent application Ser. No. 15/381,921, filed on 16 Dec. 2016, which claims the benefit of U.S. Provisional Application No. 62/268,851, filed on 17 Dec. 2015, which are hereby incorporated in their entireties by reference.

TECHNICAL FIELD

This invention relates generally to the communication field, and more specifically to a new and useful system and method for contextual communication in the communication field.

BACKGROUND

Various tools and technologies have been developed in recent years that enable more integration between services and applications with communication tools. Apps on phones and on the web can now enable a customer to initialize a call to a customer representative. Similarly, text messages can be sent to customers as reminders or confirmation. However, many of the annoyances and hassles of interacting with a customer support phone service still exist. Customers are still asked to navigate a phone tree. Customers still have to re-submit information when the customer is transferred or connected to a different agent. Thus, there is a need in the communication field to create a new and useful system and method for a media intelligence platform. This invention provides such a new and useful system and method.

BRIEF DESCRIPTION OF THE FIGURES

FIG. 5 is a flow diagram representation of an implementation of a method of a preferred embodiment;

DESCRIPTION OF THE PREFERRED EMBODIMENTS

Figure 1:
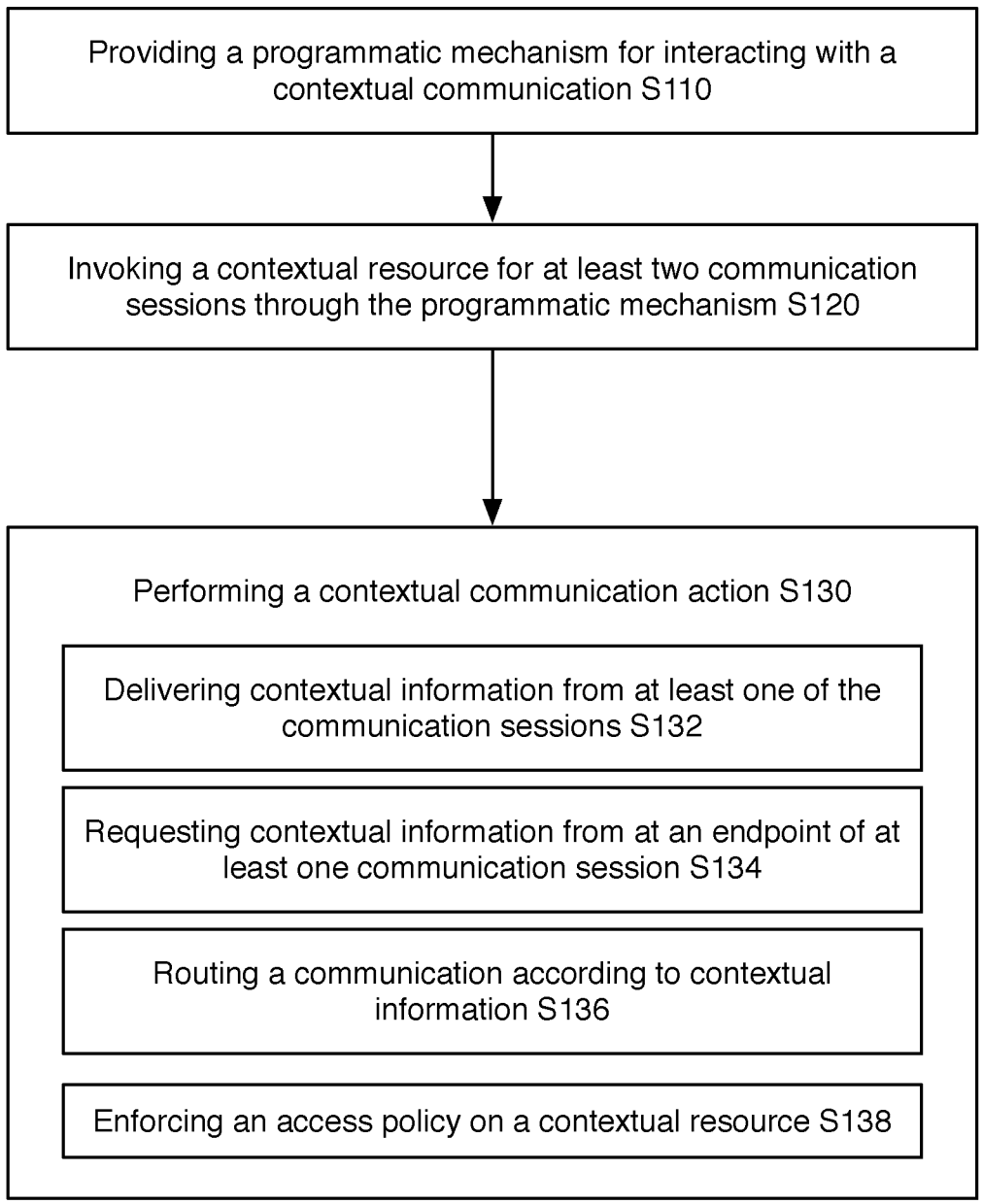
FIG. 1 is a flow diagram representation of a method of a preferred embodiment.

The following description of preferred embodiments of the invention is not intended to limit the invention to these preferred embodiments, but rather to enable any person skilled in the art to make and use this invention.

A system and method for contextual communication functions to enable information, state, and capabilities of one communication session to be used in combination with a second communication. Contextual state can preferably be shared and transferred between multiple modes and/or channels of communication. The system and method for contextual communication can enable various communications to share information and synchronize interactions across different instances and modalities of communication.

As a first potential benefit, the system and method may provide an enhanced user experience. When used within a customer support scenario, contextual information of a first communication can be synchronized with a second communication. A customer can be alleviated from entering redundant information while on the phone. For example, the basic information of a customer that was provided within an app can be synchronized with an agent speaking with the customer on the phone. Similarly, agents can provide faster and more accurate care to a customer.

As a second potential benefit, the system and method may enable contextual information to be conveyed through more appropriate or convenient mediums. Information may be selectively provided through communication channels selected by the participant. Different modes of communication offer different conveniences and capabilities. Providing information in one mode of communication may be easier or harder when compared to another mode of communication. For example, a customer could type in credit card information within an application form that was pushed to the customer during a phone call with an agent. The capability to use different mediums of communication can additionally enable a communication to be augmented with the capabilities of a second. For example, long textual information can be entered using a keyboard instead of transcribed in a call. As another example, media can be uploaded and communicated between participants. As yet another example, the camera of a smart phone may be used within an application communication to augment a voice call over the PSTN. In other cases, the technical capabilities of a mode of communication may be able to offer improved security. For example, providing credit card information over the phone to a customer care representative comes with a level of security risk, while pushing credit card information intro to a secured application or web transaction may offer a number of security benefits.

As yet another potential benefit, the system and method can enable information to be preserved across different communications. Information can be preserved or transferred during simultaneous communications, during communication transfers, between distinct non-overlapping but related communications. For example, when a call is initiated from within an application, the in-app context can be transferred and used within the call. In another example, collected information can be transferred when a call is transfer between participants. In yet another example, a call could be re-established while preserving the most recent state information if, for example, the call was disconnected.

The system and method are preferably implemented in connection with a communication platform. The communication platform functions to provide some communication service. The communication platform preferably provides a set of communication capabilities. Communication capabilities can enable synchronous or asynchronous communication channels. The communication capabilities can use telephone carrier communication systems such as PSTN, SMS, and MMS, but may alternatively use IP based communication such as SIP, WebRTC, proprietary communication protocols, or any suitable transport layer for communication. In some variations, communication can be synchronized with a web application or native application over HTTP-based protocol (e.g., HTTP or HTTPS) or any suitable application layer protocol. The medium of the communications can be voice, video, text, media-based messaging, live stream broadcasts, screencasts, immersive media (e.g., augmented or virtual reality media), and/or any suitable type of media. The communications can be between any suitable number of participants. The communication can connect a first participant with a second participant. The communication could additionally combine multiple participants. The communication may alternatively connect a first participant with an automated system. In another variation, a communication can be any suitable type of group communication with a plurality of participants.

In one variation, the communication platform provides basic routing capabilities where received messages are rerouted to another endpoint. In yet another variation, basic automated responses may be facilitated through the communication platform. In yet another variation, the communication platform can enable communications to be controlled through application logic. In one variation, account directed application logic could be used to direct control logic of a communication session such as in the application communication platform described in U.S. Pat. No. 8,306, 021, issued on 6 Nov. 2012, which is incorporated in its entirety by this reference.

The communication platform is preferably a multi-tenant communication system, where multiple accounts/users share use of common infrastructure. The communication platform may alternatively be used in a single-tenant communication system. A multitenant communication platform will include an accounting system, which can support accounts and subaccounts. An account entity (a parent account or a subaccount) can setup communication services for various phone numbers. Multiple phone numbers and/or other endpoints may be setup for each account entity.

The communication platform preferably includes some form of an interface. The interface could be a programmatic interface or a user interface (e.g., an administrator interface). The communication platform preferably includes both varieties of the interface. The programmatic interface is preferably a RESTful API but may alternatively be any suitable API such as SOAP or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service can enable contextual information to be created, accessed, and/or manipulated through the API. For example a RESTful endpoint can enable interactions with a contextual information API resource. Alternatively, a user interface may be provided to access and in some cases create or modify contextual information.

The communication platform can additionally provide various libraries and software development kits (SDKs) to facilitate development of applications or services leveraging the capabilities of the communication platform.

Additionally, the system may include a routing engine which functions to use contextual information to alter the redirection of communications that occur through the communication platform. The routing engine may be used for automatic routing and/or augmentation of communications in flight based on the contextual information. A routing engine can provide capabilities to direct communications, transcode/translate, and/or perform different actions on a communication based on the contextual information.

Figure 2:
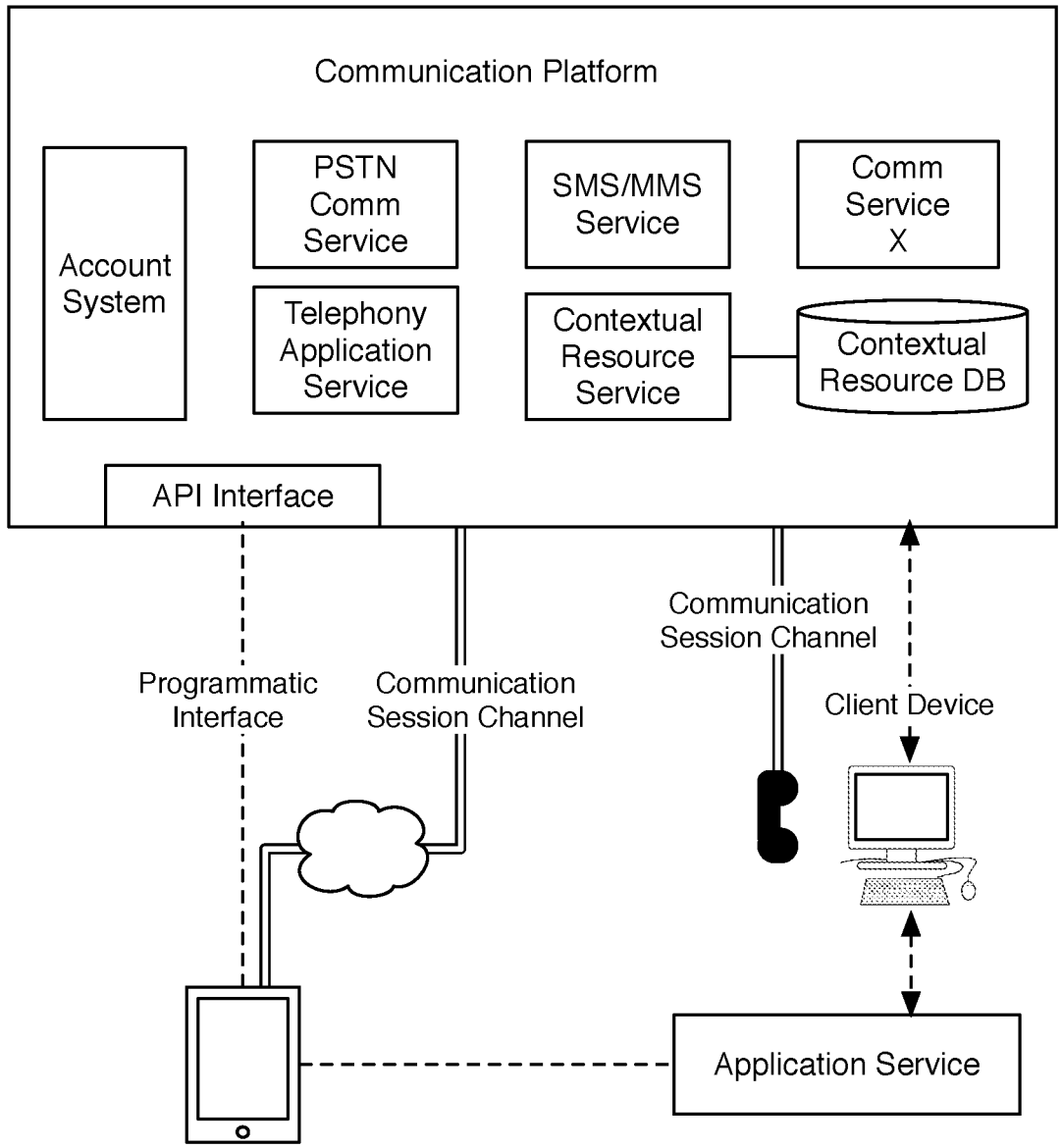
FIG. 2 is a schematic representation of an exemplary system architecture for a communication platform.

An account holder of the communication platform can preferably provide products or services with at least a portion of communication functionality built on top of the communication platform. Use of the contextual information capabilities can be leveraged for one or multiple channels of communication or interactions with the product/service as shown in FIG. 2. For example, an airline can develop a native application for a smart phone with integration into the communication platform for setting contextual information of a user. Additionally, a customer support service of the airline used by customer care representatives to service customers can have integration with the communication platform for retrieving and modifying contextual information.

Figure 3:
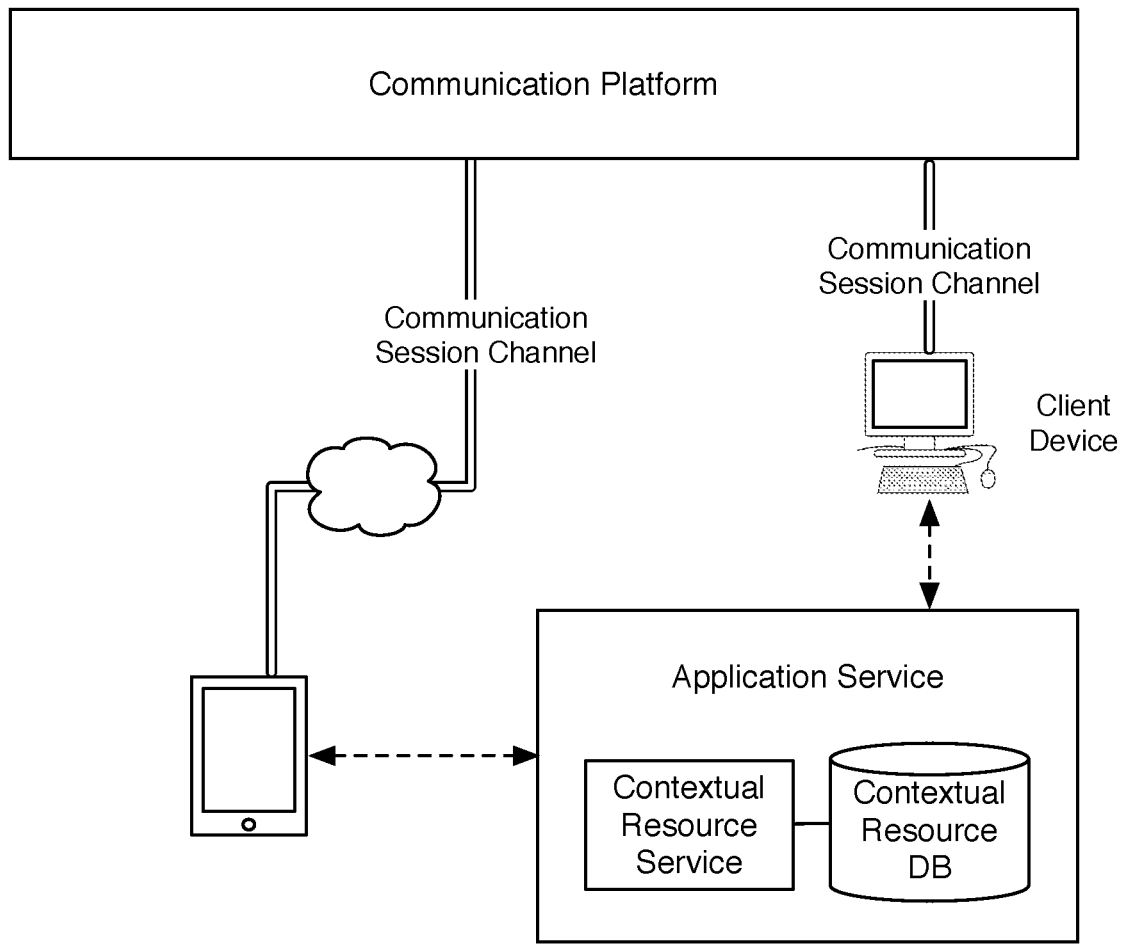
FIG. 3 is a schematic representation of an exemplary system architecture implemented by an application service.

In an alternative implementation, the system and method may be implemented by a service or product wherein the service or product can be implemented without a communication platform providing a contextual information mechanism or independent of the use of a multitenant communication platform as shown in FIG. 3. This variation may be a single tenant implementation for enabling contextual communications. In the example above, the airline may similarly build the native application and customer support service, but use an internal contextual communication service to manage and facilitate use of contextual information.

Alternative architectures could similarly be used such as offering a contextual communication service as a standalone service or product. Herein, the system and method are described as applied to a communication platform, but any suitable architecture and party division may be used.

The system and method can be applied to a variety of usage scenarios. Preferably, the system and method enable a variety of entities to develop and operate solutions simultaneously on the multitenant platform while addressing customized usage scenarios.

In one exemplary usage scenario, a customer navigates to a view within an application. That view may represent some contextual information such as the flight information for a booked flight. An agent can be called from this screen, and the relevant information can be automatically provided to the agent. For example, a button labeled "call to change flight" could redirect the user to the phone application/service of the device. Through the system and method, the contextual information from that application view can be synchronized with the initiated call. When an agent answers the call, the agent can see the customer wants to change her flight and the information of their current booking.

In another variation of the exemplary airline app scenario, the customer may perform a search for flights from within the application while on the phone with the agent. As the customer navigates, the contextual information associated with this session can be updated to reflect the current application state of the customer. This information could be viewable by the agent or alternatively, a customer may selectively share the information with the agent. This functions to facilitate clearer communication between the customer and agent. Similarly, an agent may select a proposed alternative flight using an agent flight search tool. The agent could select to share the alternative flight with the customer, and a view associated with the alternative flight may be activated within the application of the customer.

As another exemplary usage scenario, a customer can be on the phone with an agent. The agent may want to confirm information with the customer. In some cases the confirmation may be challenging to perform over the phone or may require functionality unavailable in a normal PSTN call. The system and method can enable a contextual information request to be pushed to another medium. In the airline app example above, to confirm flight change information, an agent can ask a caller to confirm information that is pushed to the customer's app. During the call, the agent could initiate the information confirmation request, an alert can play on the customer's app, and information can be viewed and confirmed from within the application. The agent can receive a notice when the customer has confirmed (or denied) the confirmation request. If a change needs to be made, the agent could easily make a change, the customer could easily suggest the change within the application or tell the agent over the phone. The agent could update the information and a subsequence confirmation request could be initiated.

As another exemplary usage scenario, a customer may be disconnected after entering lots information into an automated phone system and/or possibly being routed between different agents. The context can be preserved so that if the customer calls back a responding agent can be presented with the contextual information of the session as it was last left. More preferably, the system and method could automatically routing the subsequent call to the same or an appropriate agent based on the contextual information.

In yet another exemplary usage scenario, a customer may call for some help comparing health insurance plans. The customer can view the different plans on the insurance providers website and what plan is being viewed (and what information is currently viewed) can be provided to an agent. Similarly, the agent can make the customer's webpage jump to a particular view to help them.

Contextual communication can be used in a variety of communication topologies. The topology of a communication context can be composed of multiple discrete communication sessions. These communications can be of the same modality (e.g., voice), but may alternatively be different modalities (e.g., voice and messaging).

Contextual communication can be serial communications where communication sessions involved in synchronizing contextual information are non-overlapping communications. Information provided in one communication session is preserved for a subsequent communication.

In another variation, communication sessions happening simultaneously or in an overlapping manner can have context shared between them in real-time. Actions performed in one communication can be synchronized and available for use in a second communication session. These communication sessions can similarly be multimodal. For example, a phone call between a customer and a customer representative can have context shared with an application used by the customer.

There can additionally be any suitable number of participants in a contextual communication. Multi-party communications can have context shared for serial or parallel communications As shown in FIG. 1, a method for contextual communications can include providing a programmatic mechanism for interacting with a contextual communication S110, invoking a contextual resource for at least two communication sessions through the programmatic mechanism S120, and performing a contextual communication action S130. Performing a contextual communication action can include delivering contextual information from at least one of the communication sessions S132, requesting contextual information from at an endpoint of at least one communication session S134, routing a communication according to contextual information S136, and/or enforcing an access policy on a contextual resource S138. The method functions to enable contextual information to be used between multiple communication sessions. A communication session can include synchronous and asynchronous communication sessions. In a preferred implementation one of the communication sessions is an application session. The method is preferably implemented by a communication platform described above, but may alternatively be implemented specifically for a service or product or by any suitable system.

Block S110, which includes providing a programmatic mechanism for interacting with a contextual communication, functions to enable services and applications to leverage contextual communications. The method can be implemented by a communication platform as described. Preferably, the method provides a set of different programmatic mechanisms, which may be used separately or together. In a first variation, the programmatic mechanism is an application programming interface such as a REST API. Within a REST API, a context resource can be created and maintained so as to establish the association between contextual information and a set of communication sessions. A communication session, communication exchange (e.g., a message), application session can be added to and associated with a context resource, along with any relevant information.

A context resource could additionally or alternatively be associated with communication endpoints and/or an entity identifier. Associating a communication endpoint with a context resource could enable any current communication or future communication involving that endpoint to be associated with the context resource. An entity identifier could similarly be used to context resource to be associated with a communication based on involved parties. In the airline app example, a user may setup a user account with the airline and include a phone number. The user's phone number can be directly associated with a context resource or indirectly associated through an account identifier. If a customer called the airline from the provided phone number while using the application when signed in under that account, then contextual information can be shared through a linked context resource.

In another variation, various types of client tools can be offered to facilitate usage of contextual communication. The client tools can include software development kits (SDKs) or libraries. For example, an iOS and an Android SDK as well as a JavaScript library for use within a browser app may all be provided so that applications can be developed for these clients for contextual communications. The client tools can include convenience functions for managing and using contextual communication capabilities. The client tools can additionally include code or resources to generate particular user interface widgets. In another variation, providing a programmatic mechanism can include In another variation, providing the programmatic mechanism can include retrieving and executing communication instructions. A document could be provided that specifies a set of operations that should be performed during a communication. Preferably, the communication instructions are performed at the communication platform and can be executed for each communication session. A set of instructions can be provided so that context can be managed and used within the communication instructions.

In a service or product implementation, the service or product manages a contextual resource service. The contextual resource service preferably includes a data system that manages the storage and access of relevant context information. A set of internal interfaces can be provided for interacting with the contextual resource service.

Block S120, which includes invoking a contextual resource for at least two communication sessions through the programmatic mechanism, functions to programmatically establish a construct used in managing the contextual information of a set of communication sessions. Contextual communications can be programmatically invoked, modified, and managed. There is normally an initial communication, and at some point the context of that communication can be used in at least one other communication. This can involve associating a communication with a contextual resource when establishing the communication, during the communication, or after the communication has completed. Invoking a contextual resource may also include taking context information of two or more existing sessions and merging them such that some portion of present, past, and/or future context can be shared. A communication can be associated with a context through an API request, in the communication request, through communication application instructions, an involved endpoint, or any suitable approach. Preferably, an identifier can be used to specify what context should be used for a communication. For example, when establishing a call over an IP channel, a message during call negotiation may include a parameter specifying a unique communication identifier. In another variation, contextual association can be automatic based on preconfigured rules. For example, a set of endpoints can be registered and used in automatic formation of context around communications. The endpoints may be telephony endpoints (e.g., phone numbers, short codes, etc.), IP communication endpoints (e.g., usernames, client Ids, etc.), and/or any suitable address to a communication device. A subset of the endpoints could be associated with an entity. One or more endpoints can be associated with a contextual resource, and automatically associating the contextual resource to at least one communication session by the endpoint involved in the communication session. Endpoint association can function to simplify the process of identifying contextual resources. Communications in association with the entity or endpoint may be automatically associated to the contextual resource. In one implementation, automatic context association may be based on a single entity association. For example communications made to a customer support system are grouped by the associated entity so phone calls made by a customer and messages made through an app by the same customer are set to the same context. In another implementation, automatic context association may be based on the set of involved entities. For example, all communications between the entities of Bob, Matt, and Angela regardless of medium will be automatically associated with the same contextual resource. In this scenario a second set of communications between Bob and Matt and a third set of communications between Bob, Matt, Angela, and Audrey may similarly be associated with a distinct contextual resources.

Communication sessions could additionally have multiple contextual resources. In the example, above, a contextual resource can be set for any communication involving Angela. So in the example above, the first set of communications and the third set of communications may have two associated contextual resources.

In addition to associating a communication with a contextual resource, the method can additionally include removing or otherwise managing associations of communications with a contextual resource. Removing an association may include disassociating an endpoint from a contextual resource at some point. For example, Matt's phone number may be disassociated from a conference call with Bob and Angela when Matt leaves the call. Removing contextual resources associations may be programmatically initiated but could alternatively be configured for automatic execution for different scenarios. In some cases a contextual resource may be deleted or expired completely. Automatic execution may involve conditions relating to different communication events, time windows (e.g., "delete contextual resource after inactivity of one hour"). The contextual resources and their association with endpoints, entities, and communications may all be managed and modified.

Block S130, which includes performing a contextual communication action, functions to leverage at least one capability offered through a contextual resource. A contextual communication action preferably leverages a communication resource to bridge interactions between at least two channels of communication. The contextual communication actions can be performed in combination so as to create different user experiences. One potential set of primitives used for contextual communication actions can include delivering contextual information from at least one of the communication sessions S132, requesting contextual information from an endpoint of at least one communication session S134, routing a communication according to contextual information S136, and/or enforcing an access policy on a contextual resource S138. In some cases, bridging interactions can fulfill some portion of a request and response interaction across two or more channels. For example, a request could be made in one channel and a response delivered in another channel. Furthermore, the channel of a request or response may not be limited to a single channel. For example, a request may be made pushed through a user application but a response could be made over a variety of channels such as the user application, a voice communication, or a SMS/MMS message. Blocks S132 and S134 can preferably be used in combination in establishing different request and response interactions. Block S132 could additionally or alternatively be used in pushing information for use as an input in another channel. In other scenarios, interactions are bridged across non-overlapping communications. For example, block S136 can be used in automatically routing based on a previously established contextual resource.

Block S132, which includes delivering contextual information from at least one of the communication sessions, functions to add data to a contextual resource. Contextual information may be provided by one or more involved endpoints. By delivering the contextual information, information from one modality of communication can be synchronized with the communication platform and then optionally shared with one or more other endpoints that are associated with the same contextual resource.

In one variation, the contextual information may be explicitly transferred to the communication session. For example, a programmatic mechanism can be used to add contextual information. The contextual information may be represented as a set of key value object (e.g., JSON) or any suitable data model. The contextual information may alternatively include or be a media file or data file. The contextual information may be information usable by other inputs, wherein the delivery of contextual information is similar to pushing information for use by other communication or application sessions. The contextual information may alternatively conform to a messaging protocol, wherein setting contextual information is performed as a form of a request or response.

In one implementation, contextual information can be set when a communication is programmatically initiated. An API request can be made from an application or service to initiate a communication. When initiating the communication, the communication request can include a parameter that includes a data model of the current state of the application. The communication request is preferably received by the communication platform and the data model (i.e., the contextual information) can be added to or associated with the contextual resource. In the airline app example, the flight information associated with the current view of the application can be set as the contextual information parameter when establishing the call. Alternatively, the contextual information can be communicated in a separate communication. For example, an API call could be transmitted from the application to a contextual resource API endpoint upon a communication being initiated.

The contextual information can be used to represent a wide variety of information such as application or communication state, interaction history, entered information, or other suitable type of information. In one variation, the contextual information can be extracted from normal interactions. For example, a communication application can include instructions that specify the next 16 digits entered via DTMF should be associated with a particular key in the contextual resource. Contextual information and a log of context may be stored within the communication platform as a record or context changes.

Block S134, which includes requesting contextual information from an endpoint of at least one communication session, functions to push or prompt an endpoint to provide contextual information. There may be situations, where information may be desired by one of the endpoints (e.g., an application client). In some situations, this may occur when the current primary mode of communication lacks some functionality. For example, while on a phone call, a customer support agent could request a biometric confirmation through an app on a mobile device. Requesting contextual information may trigger performing some interaction on the endpoint such as displaying a user interface component or presenting an input form. Responses can be delivered within the same modality of communication but may alternatively be delivered in a different modality.

An SDK or library of the communication platform can provide a number of interfaces for conveniently making different forms of context requests. The context request could request various types of information through standard input forms (textfields, dropdown selection, date picker, option selection, toggle switches, etc.), a media upload, secure pin/pw entry, camera or peripheral device access (e.g., for taking photo/video or for streaming), biometric confirmation (e.g., touchID), device feature access (e.g., location, digital payment service, address book, accelerometer, accessory port, etc.), and/or any source of information or media.

Block S136, which includes routing a communication according to contextual information, functions to alter how communications are directed. Routing a communication preferably refers to the manner in which a new communication request is routed to a destination. For example, routing a communication can involve routing an incoming communication to one of a set of destinations based on contextual information. For example, a customer calling a second time may be redirected to the appropriate agent based on stored context for that customer. Routing a communication may alternatively include altering routing an established communication. One or more of the connected communication endpoints can be dynamically altered based on the contextual information. Additionally routing a communication can include altering the intermediary nodes of a communication. For example, a communication topology can be rerouted to include a recording resource or a media resource.

Routing a communication according to contextual information preferably includes, at a routing service, receiving a communication request from an initiating party, detecting at least one associated contextual resource, and establishing a communication session with the initiating party according to the contextual resource. For example, an endpoint could be associated with a contextual resource, and when an incoming communication involves that endpoint a contextual resource can be detected and associated with the resulting communication session as shown in an exemplary FIG. 4. A communication request can be a synchronous communication request such as a voice or video call request to one or more destinations. The communication request could alternatively be an asynchronous communication request such as a SMS/MMS message request or IP messaging request. The contextual resource is preferably detected by querying a contextual resource service for one or more contextual resources. As described in block S120, a contextual resource could be associated based on one or more participating endpoints, an identifier, or any suitable set or properties associated with a contextual resource.

Establishing the communication session may redirect the communication to one or more endpoints, alter the communication topology, modify the communication, or perform any suitable change when executing the communication request. The various routing actions enabled by the communication platform may be controlled through the contextual information by following a set semantics or a protocol. In one exemplary implementation, the contextual information of a contextual resource can be a JSON object with various key values. Those key values can be highly customized by a developer for their own purpose. However, a select number of keys may be reserved for specific purposes. For example, there may be keys reserved for a redirecting endpoint address or an active media service identifier. By setting a phone number for the redirecting endpoint address, incoming communications associated with that contextual resource are redirected to that phone number. There may be a redirecting address for voice, video, messaging, and/or any suitable communication channel. The active media service may be used to indicate particular features of the communication service that should be activated such as recording.

Block S138, which includes enforcing an access policy on a contextual resource, functions to apply permissions to how contextual information is shared and accessed. Permissions, privacy, transparency, and other forms of policy can be enforced to regulate how and what can be shared as context. Policy rules can be defined around endpoints so as to restrict, grant, or limit access to information and media of the contextual resource. Policy can additionally be used to set contextual information expiration based on time, number of communication sessions, or any suitable condition. Additionally, mechanisms may be put in place to enable requesting permissions to access different devices, device capabilities, modes of communication, pieces of information. For example, client SDKs can provide alerts when the camera, location services, biometrics, or other device capabilities are being accessed.

One exemplary implementation of the method can be used in bridging interactions of a first communication session with a second communication session. The communication sessions can be synchronous or asynchronous communications. In one preferred embodiment, the first communication session is an application session, wherein an application session includes the state of a user application in combination with a remote service (asynchronously or synchronously).

As shown in FIG. 5, the above method can be applied to a preferred usage scenario by creating a contextual resource that is initially associated with at least at first communication session S210; receiving an incoming communication request and establishing a second communication session S220; associating the second communication session with the contextual resource S230; setting contextual information of the contextual resource S240; and performing at least one contextual communication action through a programmatic interface of the contextual resource S250.

This usage scenario is generally started through usage of an application such as a smart phone app, a web application, or any suitable application. That application can have an asynchronous session with a web service. At some point a user initiates a communication. Additionally, a contextual resource with contextual information of the application is set. The contextual information may be set when creating the contextual resource, but the contextual information may alternatively be set after creation and updated at any suitable time.

Figure 4:
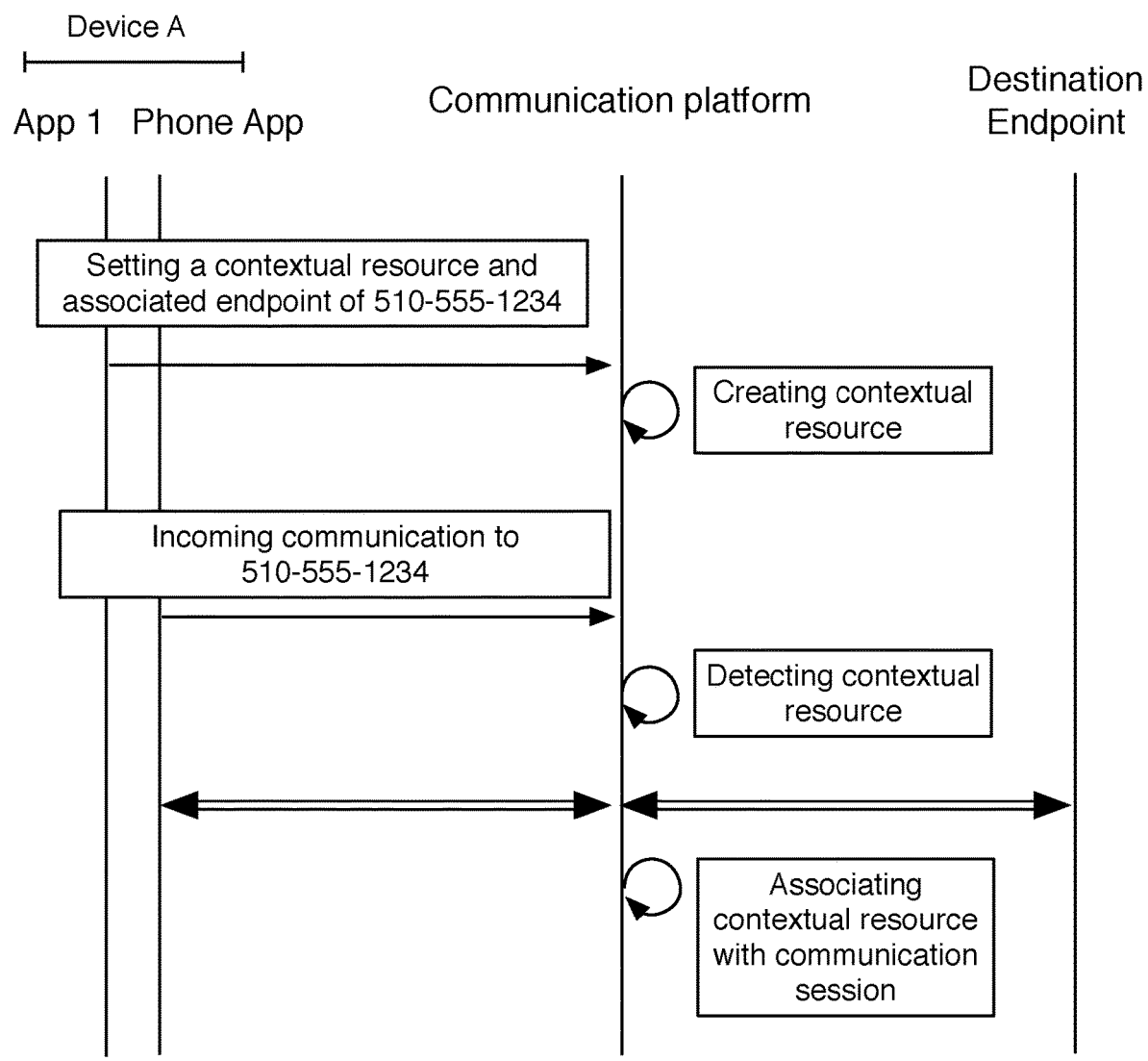
FIG. 4 a schematic communication flow of associating a communication with a contextual resource.
Figure 6:
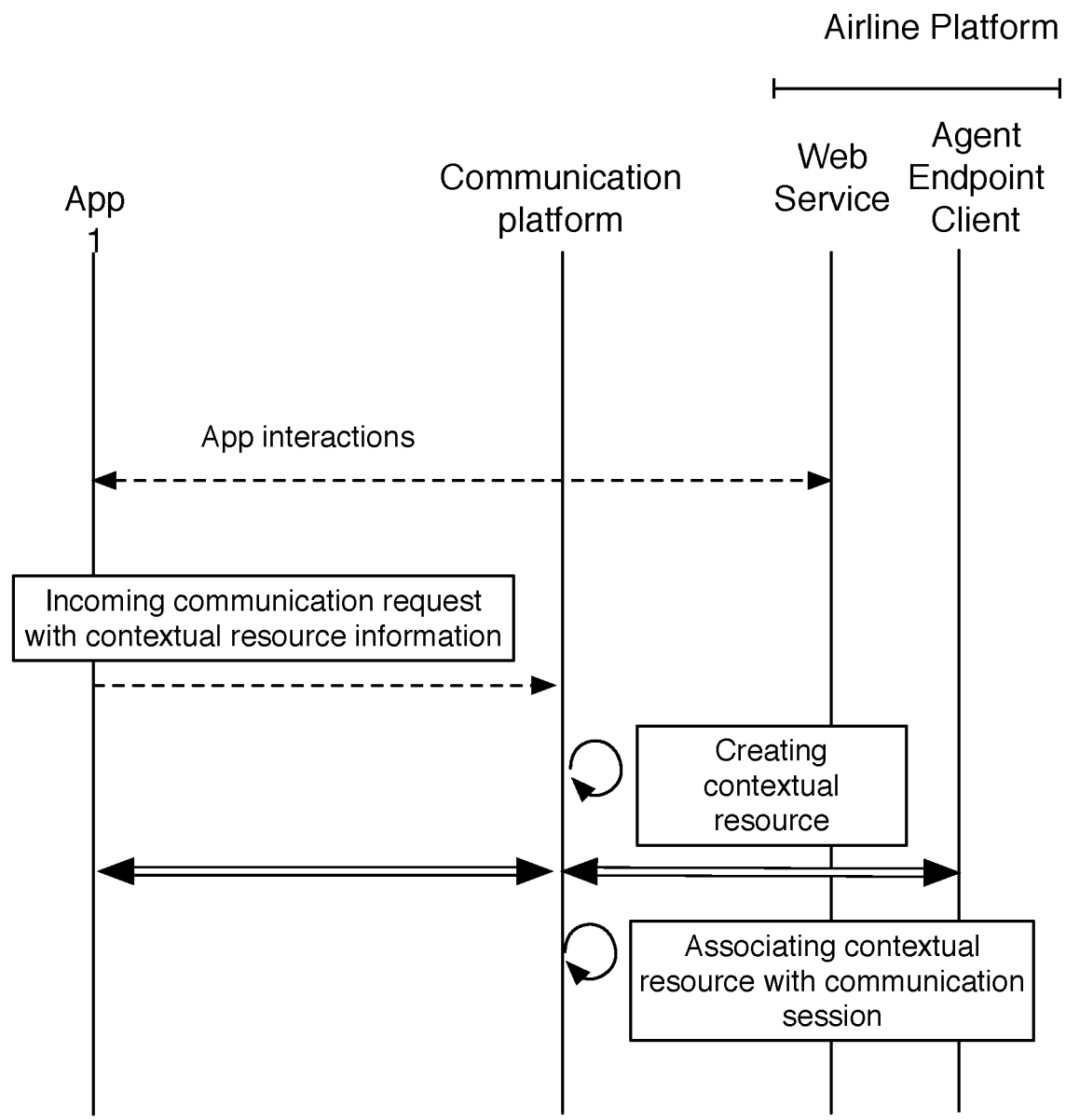
FIG. 6 a schematic communication flow of associating a communication with a contextual resource through a communication request.

A variety of approaches may be used in associating a communication session with the contextual resource. A communication session may be associated with a contextual resource when establishing the communication session. In one variation, a communication request is initiated by the application using a programmatic interface. In this way a communication can explicitly associated with that application session. The contextual resource can be set through the communication request as shown in FIG. 6. In another variation, an endpoint is associated with the contextual resource. When an incoming communication request is received, the source endpoint, destination endpoint(s), and/or other suitable properties can be used to associate a resulting communication session with the contextual resource as shown in FIG. 4.

Performing a contextual communication through a programmatic interface S250 can include any of the variations of the associated process Block S130 and functions to bridge contextual information between the first and second communication sessions.

Figure 7:
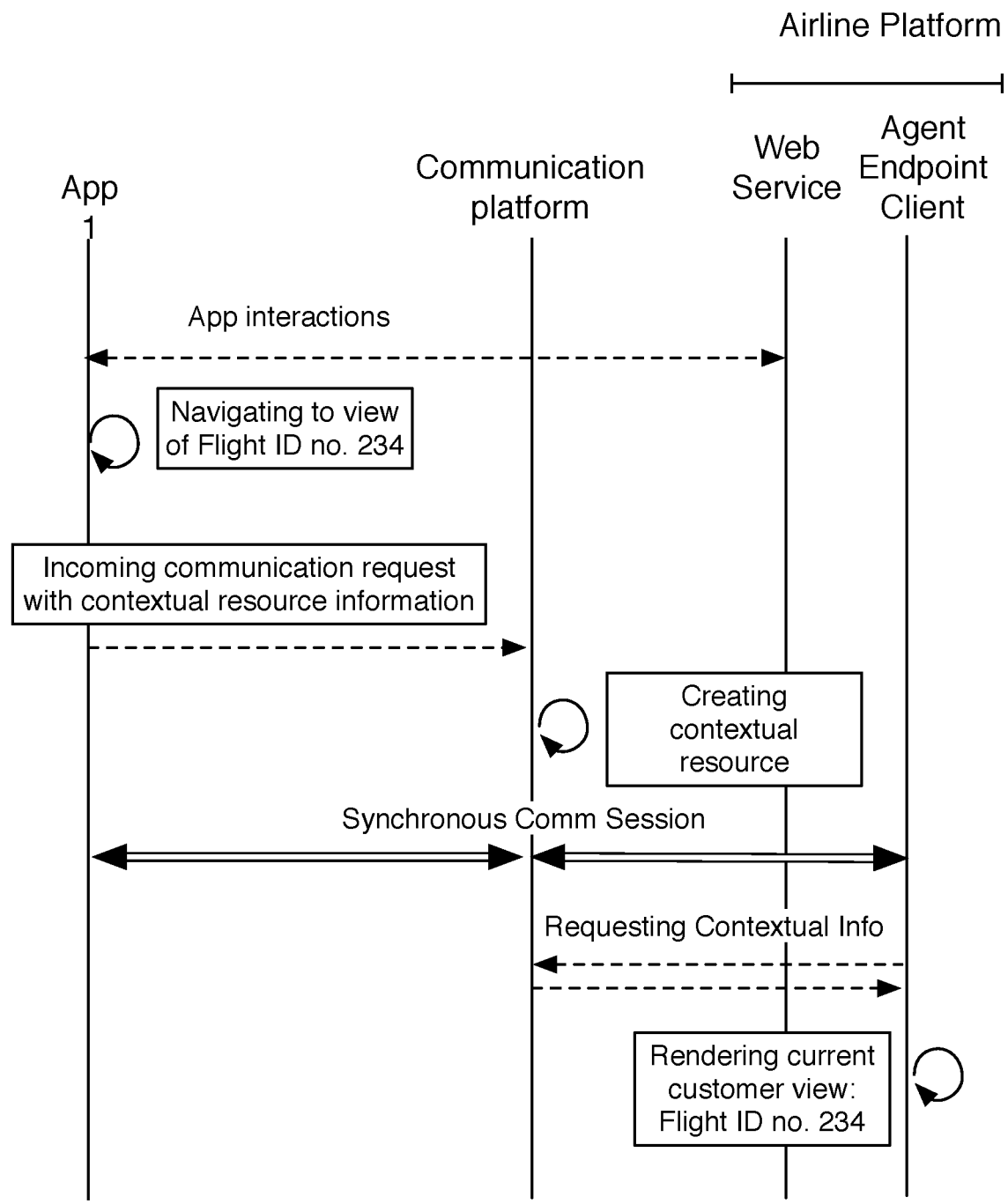
FIG. 7 is a schematic communication flow of delivering contextual information to a client application.

In one variation, the bridging of interactions is used to provide information to another participant through a different channel when the communication is received. Preferably, when the communication is established, the contextual information is synchronized with a client application of at least one of the communication destination endpoints as shown in FIG. 7. When using IP based communications this could be the same application used as the endpoint. In a customer care use-case, the agent assigned to handle the call will have an agent application running that will access the relevant contextual information and generate an appropriate user interface.

In another variation, the bridging of interactions is used to route the communication. Routing a communication can include: upon receiving an incoming communication request, selecting a destination endpoint according to the associated contextual resource; and routing the incoming communication request and establishing the second communication session with the selected destination endpoint. In one usage example, this can enable interactions with an application to allow a customer to avoid triaging and information entry. For example, a banking customer may be able to go to a website, select their appropriate reason for calling, enter requested information in a convenient web form, and then initiate the call to be directly routed to the appropriate agent. When combined with the above variation, that agent will additionally be provided with all the entered information.

Figure 8:
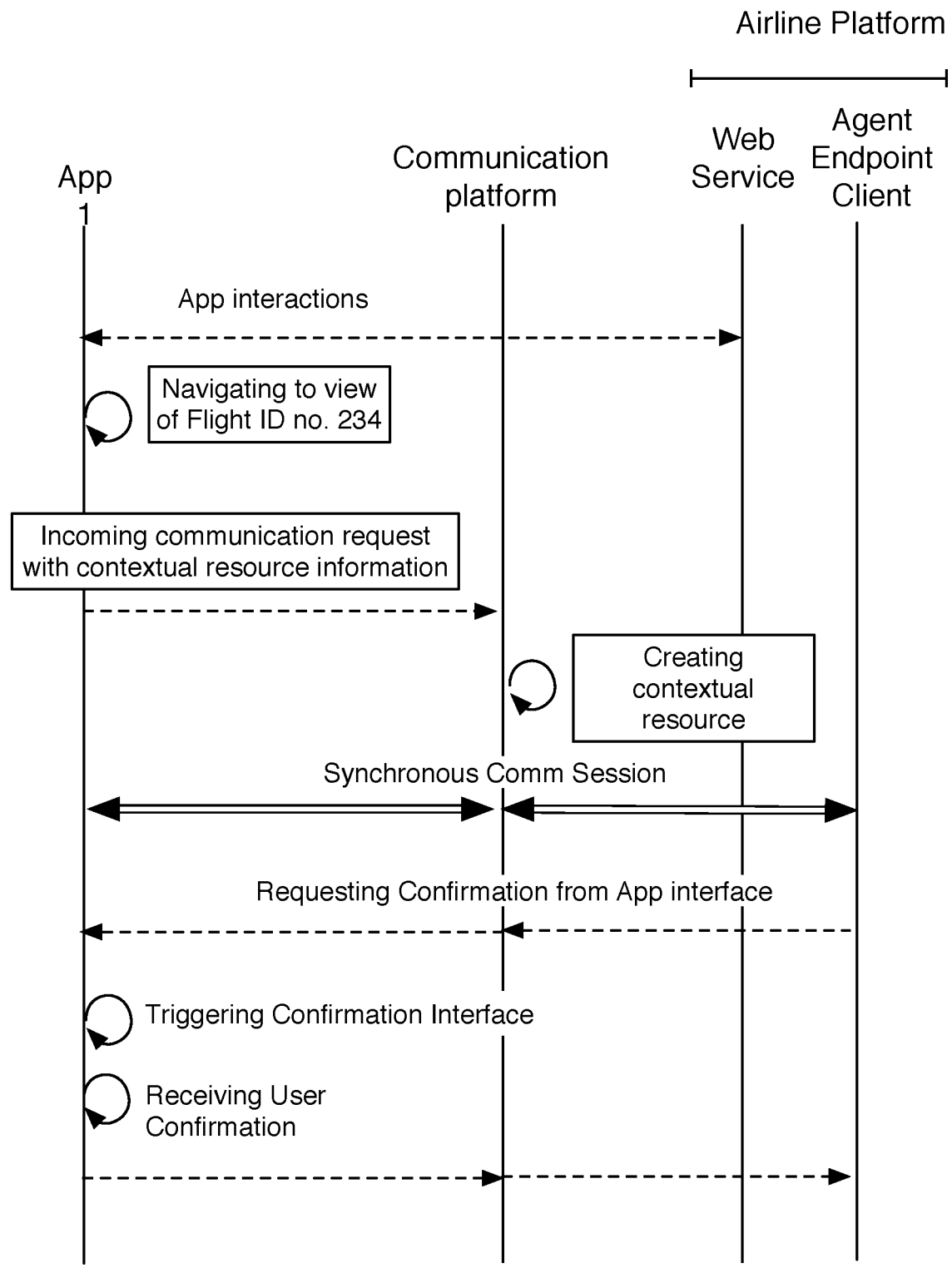
FIG. 8 is a schematic communication flow of a client application initiates requesting contextual from an application session.

Additionally, the bridging of interactions may be used to enable requests for contextual information during a communication. A contextual information request may be performed after one or more of the variations described herein (e.g., providing information to an agent or routing the communication), but could alternatively be the only use of a contextual resource. In the example where an agent has a client application that is used to view contextual information from an application session while on a call with a customer, the client application can facilitate sending a request for contextual information to the user application as shown in FIG. 8. As a result the application session can trigger a user interface according to the contextual request. For example, while on the phone with a customer, the agent may require credit card information. A credit card request could be pushed to a user application, which the user can easily complete.

Another exemplary implementation of the method can be used in bridging interactions across related communications. This can be used for bridging interactions across communications separated in time. This can be used for bridging interactions across different communication mediums. In this implementation, an initial communication is established; a contextual resource is created; a second communication is established; and the contextual resource is used to augment how that communication is established, access contextual information from the initial communication, or use the contextual resource in any suitable manner.

In one example, user may initially begin messaging a chat service. A number of messages could be exchanged with the chat service. The chat service may have a human responding, but the chat service could alternatively be an automated chatbot. At some point, the user may call a phone number associated with the chat service. The call can be routed according to the contextual resource.

Figure 9:
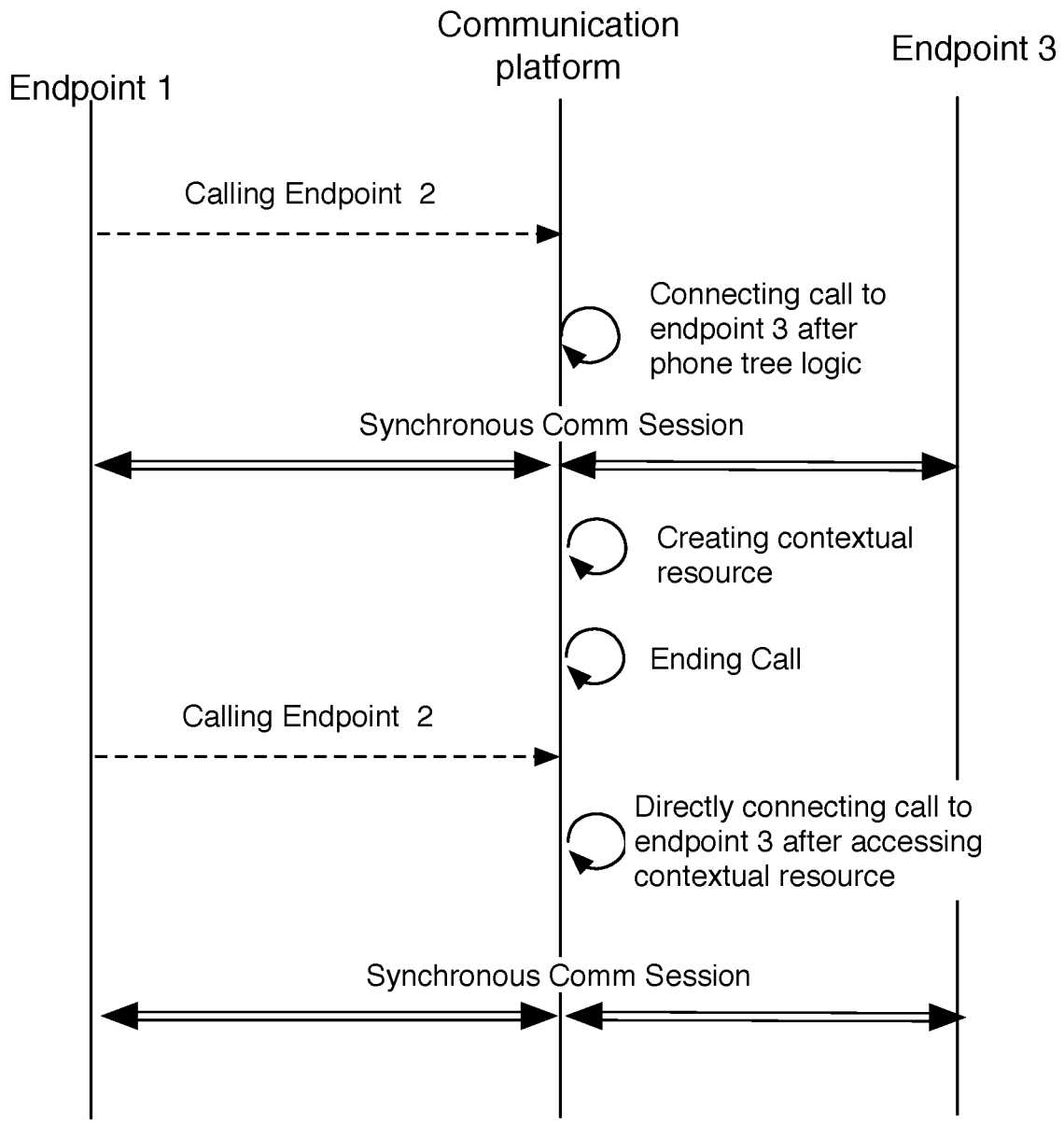
FIG. 9 is a schematic communication flow of using a contextual resource for routing an incoming communication.

In another example, a first call may be made and a contextual resource is established to map the setup of that communication (e.g., involved parties, activated media services, etc.). At some point the call ends. The contextual resource can be preserved, possibly only for a limited time until it expires. At a later time, a second call is made, and the communication is setup to emulate the last state of the communication as specified in the contextual resource. In one example, this may enable a customer disconnected from a customer support agent to call back and be immediately connected to the same customer support agent as shown in FIG. 9.

The system and method of the preferred embodiment and variations thereof can be embodied and/or implemented at least in part as a machine configured to receive a computer-readable medium storing computer-readable instructions.

The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   creating a contextual resource with contextual information about a first communication session using a first communication modality between a first device and a server device, the contextual information indicating a state of an application, the state of the application being set from a user action providing user information;
   detecting, by a communication platform, a request from the first device for a second communication session using a second communication modality different from the first communication modality and overlapping in time with the first communication session;
   accessing, in response to the request for the second communication session, the contextual resource;
   selecting, based on the contextual resource, a second device of a destination endpoint for the second communication session;
   establishing the second communication session between the first device and the server device using the second communication modality;
   rerouting the established second communication session to the second device based on the contextual information about the first communication session;
   receiving an Application Programing Interface (API) request for the contextual resource from the second device;
   transmitting at least a portion of the contextual information maintained by the contextual resource to the second device, the portion indicating the state of the application set from the user action providing the user information, the second device causing presentation of a customized user interface based on the portion of the contextual information;
   receiving a further request from the first device via the first communication session that uses the first communication modality; and
   providing a response to the further request to the first device via the second communication session that overlaps in time with the first communication session and uses the second communication modality that is different from the first communication modality.

2. The method of claim 1, further comprising:
   receiving an incoming communication request directed to the second device, the incoming communication request being associated with the first device.

3. The method of claim 1, wherein the contextual information indicates that a previous communication session was established between the first device and the server device.

4. The method of claim 1, wherein the contextual information includes data provided by a user during the at least one previous communication session associated with the first device.

5. The method of claim 1, further comprising:
   establishing a third communication session between a third device and a fourth device;
   associating the third communication session with a second established contextual resource identified based on the third device, the second established contextual resource maintaining contextual information related to at least one previous communication session associated with the third device;
   receiving an API request for the second established contextual resource from the fourth device; and
   transmitting at least a portion of the contextual information maintained by the second established contextual resource to the fourth device, the fourth device causing presentation of a second customized user interface based on the at least a portion of the contextual information from the second established contextual resource, the second customized user interface being different than the customized user interface presented by the second device.

6. The method of claim 1, wherein the second device is an agent application executing on a computing device.

7. A communication platform comprising:
   one or more computer processors; and
   one or more computer-readable mediums storing instructions that, when executed by the one or more computer processors, cause the communication platform to perform operations comprising:
   creating a contextual resource with contextual information about a first communication session using a first communication modality between a first device and a server device, the contextual information indicating a state of an application, the state of the application being set from a user action providing user information;
   detecting, by a communication platform, a request from the first device for a second communication session using a second communication modality different from the first communication modality and overlapping in time with the first communication session;
   accessing, in response to the request for the second communication session, the contextual resource;
   selecting, based on the contextual resource, a second device of a destination endpoint for the second communication session;
   establishing the second communication session between the first device and the server device using the second communication modality;
   rerouting the established second communication session to the second device based on the contextual information about the first communication session;
   receiving an Application Programing Interface (API) request for the contextual resource from the second device;
   transmitting at least a portion of the contextual information maintained by the contextual-resource to the second device, the portion indicating the state of the application set from the user action providing the user information, the second device causing presentation of a customized user interface based on the portion of the contextual information;
   receiving a further request from the first device via the first communication session that uses the first communication modality; and providing a response to the further request to the first device via the second communication session that overlaps in time with the first communication session and uses the second communication modality that is different from the first communication modality.

8. The communication platform of claim 7, the operations further comprising:
receiving an incoming communication request directed to the second device, the incoming communication request being associated with the first device.

9. The communication platform of claim 7, wherein the contextual information indicates that a previous communication session was established between the first device and the server device.

10. The communication platform of claim 7, wherein the contextual information includes data provided by a user during the at least one previous communication session associated with the first device.

11. The communication platform of claim 7, the operations further comprising:
establishing a third communication session between a third device and a fourth device;
associating the third communication session with a second established contextual resource identified based on the third device, the second established contextual resource maintaining contextual information related to at least one previous communication session associated with the third device;
receiving an API request for the second established contextual resource from the fourth device; and
transmitting at least a portion of the contextual information maintained by the second established contextual resource to the fourth device, the fourth device causing presentation of a second customized user interface based on the at least a portion of the contextual information from the second established contextual resource, the second customized user interface being different than the customized user interface presented by the second device.

12. The communication platform of claim 7, wherein the second device is an agent application executing on a computing device.

13. A non-transitory computer-readable medium storing instructions that, when executed by one or more computer processors of a communication platform, cause the communication platform to perform operations comprising:
creating a contextual resource with contextual information about a first communication session using a first communication modality between a first device and a server device, the contextual information indicating a state of an application, the state of the application being set from a user action providing user information;
detecting, by a communication platform, a request from the first device for a second communication session using a second communication modality different from the first communication modality and overlapping in time with the first communication session;
accessing, in response to the request for the second communication session, the contextual resource;
selecting, based on the contextual resource, a second device of a destination endpoint for the second communication session;
establishing the second communication session between the first device and the server device using the second communication modality;
rerouting the established second communication session to the second device based on the contextual information about the first communication session;
receiving an Application Programing Interface (API) request for the contextual resource from the second device;
transmitting at least a portion of the contextual information maintained by the contextual resource to the second device, the portion indicating the state of the application set from the user action providing the user information, the second device causing presentation of a customized user interface based on the portion of the contextual information;
receiving a further request from the first device via the first communication session that uses the first communication modality; and
providing a response to the further request to the first device via the second communication session that overlaps in time with the first communication session and uses the second communication modality that is different from the first communication modality.

14. The non-transitory computer-readable medium of claim 13, the operations further comprising:
receiving an incoming communication request directed to the second device, the incoming communication request being associated with the first device.

15. The non-transitory computer-readable medium of claim 13, wherein the contextual information indicates that a previous communication session was established between the first device and the server device.

16. The non-transitory computer-readable medium of claim 13, wherein the contextual information includes data provided by a user during the at least one previous communication session associated with the first device.

17. The non-transitory computer-readable medium of claim 13, the operations further comprising:
establishing a third communication session between a third device and a fourth device;
associating the third communication session with a second established contextual resource identified based on the third device, the second established contextual resource maintaining contextual information related to at least one previous communication session associated with the third device;
receiving an API request for the second established contextual resource from the fourth device; and
transmitting at least a portion of the contextual information maintained by the second established contextual resource to the fourth device, the fourth device causing presentation of a second customized user interface based on the at least a portion of the contextual information from the second established contextual resource, the second customized user interface being different than the customized user interface presented by the second device.

* * * * *